United States Patent
Maxwell

(10) Patent No.: US 10,176,366 B1
(45) Date of Patent: Jan. 8, 2019

(54) VIDEO RELAY SERVICE, COMMUNICATION SYSTEM, AND RELATED METHODS FOR PERFORMING ARTIFICIAL INTELLIGENCE SIGN LANGUAGE TRANSLATION SERVICES IN A VIDEO RELAY SERVICE ENVIRONMENT

(71) Applicant: SORENSON IP HOLDINGS LLC, Salt Lake City, UT (US)

(72) Inventor: Conrad A. Maxwell, Herriman, UT (US)

(73) Assignee: SORENSON IP HOLDINGS LLC, Salt Lake City, UT (US)

( * ) Notice: Subject to any disclaimer, the term of this patent is extended or adjusted under 35 U.S.C. 154(b) by 0 days.

(21) Appl. No.: 15/801,190

(22) Filed: Nov. 1, 2017

(51) Int. Cl.
| | | |
|---|---|---|
| H04N 7/15 | (2006.01) |
| G06K 9/00 | (2006.01) |
| H04N 5/14 | (2006.01) |
| H04N 21/4223 | (2011.01) |
| H04N 7/14 | (2006.01) |
| G09B 21/00 | (2006.01) |
| G06F 17/28 | (2006.01) |
| G06K 9/62 | (2006.01) |

(52) U.S. Cl.
CPC ..... *G06K 9/00335* (2013.01); *G06F 17/2881* (2013.01); *H04N 5/144* (2013.01); *H04N 7/147* (2013.01); *H04N 21/4223* (2013.01); *G06F 17/2872* (2013.01); *G06K 9/6293* (2013.01); *G09B 21/009* (2013.01)

(58) Field of Classification Search
None
See application file for complete search history.

(56) References Cited

U.S. PATENT DOCUMENTS

| | | | |
|---|---|---|---|
| 5,473,705 A | 12/1995 | Abe et al. |
| 5,699,441 A | 12/1997 | Sagawa et al. |
| 5,887,069 A | 3/1999 | Sakou et al. |
| 5,953,693 A | 9/1999 | Sakiyama et al. |
| 6,072,494 A | 6/2000 | Nguyen |
| 6,477,239 B1 | 11/2002 | Ohki et al. |
| 8,379,801 B2 | 2/2013 | Romriell et al. |
| 8,493,174 B2 | 7/2013 | Agrawal |
| 8,610,755 B2 | 12/2013 | Brooksby et al. |
| 8,751,215 B2 | 6/2014 | Tardif |
| 8,976,940 B2 | 3/2015 | Maxwell et al. |
| 9,098,493 B2 | 8/2015 | Tardif |

(Continued)

FOREIGN PATENT DOCUMENTS

WO 2011107420 A1 9/2011

*Primary Examiner* — Creighton Smith
(74) *Attorney, Agent, or Firm* — TraskBritt

(57) ABSTRACT

Video relay services, communication systems, and methods are disclosed herein. The video relay service for providing automatic translation services during a real-time communication session. The video relay service comprises at least one server configured to receive a video stream containing sign language content from a video communication device associated with a hearing-impaired user; automatically translate the sign language content into a verbal language translation during the real-time communication session without assistance of a human sign language interpreter; and transmit the verbal language translation to a far-end communication device associated with a hearing-capable user during the real-time communication session.

24 Claims, 13 Drawing Sheets

(56) References Cited

U.S. PATENT DOCUMENTS

| | | |
|---|---|---|
| 9,215,409 B2 | 12/2015 | Montero et al. |
| 9,262,688 B1 | 2/2016 | Zadeh |
| 9,276,971 B1 | 3/2016 | Walker et al. |
| 9,432,622 B1 | 8/2016 | Winsor et al. |
| 2002/0152077 A1 | 10/2002 | Patterson |
| 2004/0014017 A1* | 1/2004 | Lo .......................... G09B 7/00 434/322 |
| 2009/0012788 A1* | 1/2009 | Gilbert ................ G09B 21/009 704/235 |
| 2009/0174759 A1* | 7/2009 | Yeh ........................ H04N 7/142 348/14.01 |
| 2010/0159891 A1 | 6/2010 | Sigmund et al. |
| 2011/0206189 A1 | 8/2011 | Kennedy et al. |
| 2011/0234384 A1 | 9/2011 | Agrawal |
| 2011/0301934 A1 | 12/2011 | Tardif |
| 2013/0010051 A1 | 1/2013 | Shlaimoun et al. |
| 2013/0212501 A1 | 8/2013 | Anderson et al. |
| 2014/0046661 A1 | 2/2014 | Bruner |
| 2014/0164703 A1* | 6/2014 | Kuesel ................ G06F 12/0802 711/122 |
| 2015/0022616 A1* | 1/2015 | Talbot .................... H04N 7/147 348/14.01 |
| 2016/0005336 A1 | 1/2016 | Peng et al. |
| 2016/0042228 A1 | 2/2016 | Opalka et al. |
| 2016/0170970 A1* | 6/2016 | Lindblom ............... G06F 17/28 704/3 |
| 2017/0032660 A1* | 2/2017 | El-Mankabady ...... G08B 25/10 |
| 2017/0277684 A1* | 9/2017 | Dharmarajan Mary .................... G06F 17/2836 |
| 2018/0121422 A1* | 5/2018 | Cuthbert ........... G06F 17/30244 |

\* cited by examiner

| VIDEO | TRANSLATION |
|---|---|
| 000000001 | DOG |
| 000000002 | DOG |
| 000000003 | DOG |
| 000000004 | CAT |
| 000000005 | GOING TO THE STORE |
| 000000006 | GOING TO THE STORE |
| 000000007 | HOW ARE YOU DOING TODAY? |
| 000000008 | I'M SORRY. |
| 000000009 | A |
| 000000010 | B |
| 000000011 | 1 |
| 000000012 | 2 |
| ... | ... |

US 10,176,366 B1

VIDEO RELAY SERVICE, COMMUNICATION SYSTEM, AND RELATED METHODS FOR PERFORMING ARTIFICIAL INTELLIGENCE SIGN LANGUAGE TRANSLATION SERVICES IN A VIDEO RELAY SERVICE ENVIRONMENT

TECHNICAL FIELD

The disclosure relates to telecommunication systems generally, including video relay services that provide sign language interpretive services for hearing-impaired users. More specifically, the disclosure relates to incorporating artificial intelligence within the video relay service environment to perform sign language translation during a live call without the use of a human interpreter.

BACKGROUND

Traditional communication systems, such as standard and cellular telephone systems, enable verbal communications between people at different locations. Communication systems for hard-of-hearing individuals may also enable non-verbal communications instead of, or in addition to, verbal communications. Some communication systems for hard-of-hearing people enable communications between communication devices for hard-of-hearing people and communication systems for hearing users (e.g., standard telephones, cellular telephones, etc.) For example, a video relay service (VRS) may provide speech to sign language translation services, and sign language to speech translation services for a communication session between a video phone for a hearing-impaired user and a traditional telephone for a hearing-capable user. With conventional VRS systems, the hearing-impaired user communicates with a human call assistant (e.g., communicating via sign language) over a first connection, and the human call assistant conveys the messages (e.g., communicating via voice) with the far-end user over a second connection. Typical VRS services provide call centers that employ sign language interpreters that provide the sign language interpretation for calls that involve a hearing-impaired user and a hearing-capable user.

BRIEF SUMMARY

In some embodiments, the disclosure includes a video relay service for providing automatic translation services during a real-time communication session, the video relay service comprising at least one server configured to receive a video stream containing sign language content from a video communication device associated with a hearing-impaired user, automatically translate the sign language content into a verbal language translation during the real-time communication session without assistance of a human sign language interpreter, and transmit the verbal language translation to a far-end communication device associated with a hearing-capable user during the real-time communication session.

A method of performing automated translation services during a real-time communication session is disclosed. The method comprises establishing a communication session between a video communication device associated with a hearing-impaired user and a far-end communication device associated with a hearing-capable user through an artificial intelligence (AI) translation engine, automatically generating, with the AI translation engine, a first translation of sign language content from a video stream from the video communication device without a human sign language interpreter performing the sign language translation for the communication session, and transmitting the first translation from the AI translation engine to the far-end communication device during the real-time communication session.

A video communication system is disclosed comprising a plurality of video communication devices configured for hearing-impaired users to engage in communication sessions with hearing-capable users and a video relay service. The video relay service is configured to establish communication sessions between video communication devices associated with hearing-impaired users and far-end communication device associated with hearing-capable users, automatically generate translations of sign language content from a video stream from the corresponding video communication device during real-time communication sessions without a human sign language interpreter performing the sign language translation for the communication session, transmit the translation from the AI translation engine to the corresponding far-end communication device, automatically generate with the AI translation engine, a second translation of voice content from an audio stream from the corresponding far-end communication device, and transmit the second translation from the AI translation engine to the video communication device during the real-time communication session.

DETAILED DESCRIPTION

Figure 1:
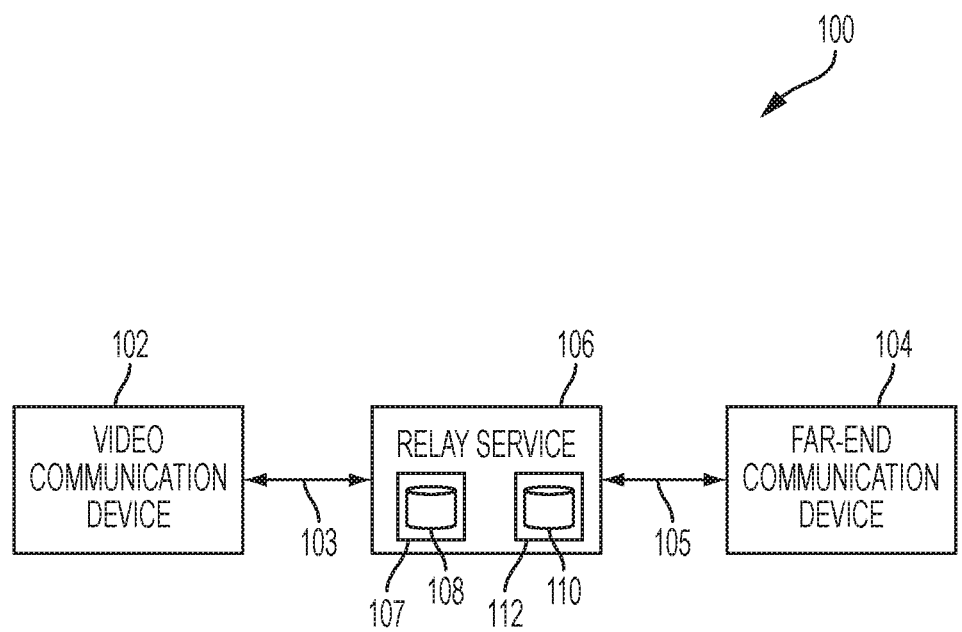
FIG. 1 is a simplified block diagram of a communication system according to an embodiment of the disclosure.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

A processor herein may be any processor, controller, microcontroller, or state machine suitable for carrying out processes of the disclosure. In particular, the processor may be configured to process real-time video images and objects with parallel processors with a GPU or image pipeline as the hardware support for the AI engines described below. Parallel processing of live video with object detection software may utilize multiple GPU-like processors to handle the live video. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video relay service for providing sign language interpretation services to assist hearing-impaired users. Embodiments include features that improve the functionality of the video relay service such that a new video relay service and method for operating a video relay service without a human sign language interpreter is provided.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "connect," "connecting," "connection," and other derivations of "connect" refer to communicating or establishing a communication session between two or more elements. These terms do not necessarily mean that there is a physical connection between the elements. The "connection" may be through an appropriate wireless communication network as well as a wired communication network. It should be understood that the phrase "connecting a user" (or variations thereof) is a shorthand way to describe connecting the device associated with the user with another device associated with another user. Similarly, it should be understood that phrases such as "transmitting data to a user," "receiving data from a user," "communicating with a user" are also shorthand for data communication between the communication devices associated with the respective users.

Embodiments of the disclosure include apparatuses and methods for operating a telecommunication system. In a typical relay system environment, a video communication device may be operated by a user having an hearing impairment, and the far-end communication device 104 may be operated by an hearing-capable user. For convenience, a video communication device may also be referred to as a "near-end" device or a "far-end" device. The user of a video communication device may be referred to as "near-end user" or a "far-end user." Of course, it is recognized that "near-end" and "far-end" are relative terms depending on the perspective of the particular user. Most examples herein are described from the perspective of the hearing-impaired user. Thus, the terms "near-end" and "far-end" are to be understood as a convenient way of distinguishing between devices or users. It is also recognized that calls that involve the VRS system may originate from either the hearing-impaired user or the hearing-capable user.

Embodiments of the disclosure include a VRS system that incorporates an artificial intelligence engine configured to provide sign language interpretation of a real-time (i.e., "live") communication session without a human sign language interpreter. For example, the artificial intelligence engine is configured to receive video stream including the sign language video stream from the hearing impaired user, analyze the video data to recognize phrases stored in a sign language database (e.g., American Sign Language), and translate the sign language data into the spoken language of the hearing-capable user (e.g., English, Spanish, etc.). The artificial intelligence engine then communicates the translated data (e.g., voice and/or text) to the hearing-capable user during the call. The artificial intelligence engine is also configured to receive the audio stream including voice data from the hearing-capable user, analyze the voice data (e.g., using voice recognition software) to translate the voice data into a language supported by the system that is understood by the hearing-impaired user. In some embodiments, the artificial intelligence engine then communications the translated data (e.g., text and/or gestures) to the hearing-impaired user during the call. Thus, the use of human sign language interpreters may not be required for a call. As a result, the video relay service may be enhanced and streamlined over conventional methods. In addition, the number of sign language interpreters required by the video relay service may be significantly reduced.

Although the focus of the disclosure is on automatically translating calls between a hearing-impaired user and a hearing-capable user, VRS systems may also be configured to facilitate communication sessions between video communication devices of multiple hearing-impaired users. Such a call may not require translation services, and may occur as a point-to-point call without involving the artificial intelligence translation engine. Thus, it is contemplated that embodiments may also be configured to facilitate communication between hearing-impaired users as well.

FIG. 1 is a simplified block diagram of a communication system 100 according to an embodiment of the disclosure. The communication system 100 may include a video relay service (VRS) configured to facilitate communication between hearing-impaired users and far-end users (e.g., hearing-capable users, computerized systems, etc.). The depicted communication system 100 includes a video communication device 102 and a far-end communication device 104 that are configured to participate in communication sessions via a video relay service 106 through one or more networks. During a live communication session the video communication device 102 is connected to the video relay service 106 over a first connection 103, and the video relay service 106 is connected to the far-end communication device 104 over a second connection 105.

It should be understood that the video communication device 102, the far-end communication device 104, and the relay service 106 may be configured to transmit the data signals 103, 105 over one or more networks. The networks used for conveying the data signals 103, 105 may include an internet protocol (IP) network. The networks may also include other networks, such as, for example, public switched telephone networks (PSTNs). The networks may include a wide area network (WAN), a local area network (LAN), a personal area network (PAN), and wireless cell networks such as FDMA, TDMA, CDMA, OFDMA, etc. and and combinations thereof. In some embodiments, the networks may include a cloud network. The networks may be configured to facilitate wireless communications, communications through cables, and combinations thereof. Some non-limiting examples of suitable wireless communications may include "Wi-Fi" and mobile wireless networks. Some non-limiting examples of suitable cables include fiber-optic cables, coaxial cables, traditional telephone cables, and Ethernet cables.

In some embodiments, the video communication device 102 may comprise a communication device specifically configured for use by an hearing-impaired user. Communication devices that may be used to assist users having such an impairment may include a video phone device, a text-captioned device, a keyboard, a remote control, other devices or accessibility interfaces, and combinations thereof. The video communication device 102 may include a computing device configured to execute software directed to perform such communication capabilities. In such an embodiment, the computing device may be modified with software to operate as a video communication device. Examples of suitable computing devices may include a desktop computer, a laptop computer, a tablet computer, a personal digital assistant (PDA), a smartphone, a set top box coupled with a monitor (e.g., television) and camera (e.g., webcam), and other computing devices. Communication devices may also be referred to as "endpoints."

Video data (e.g., streaming image data captured by a camera) may be transmitted from the video communication device 102 to the video relay service 106 over the first connection 103. The video data may include content such as the sign language gestures made by the near-impaired user. If the near-end user has at least some speech capabilities (e.g., users that are hearing-impaired, but have some ability to speak), voice data may be transmitted from the video communication device 102 to the video relay service 106 over the first connection 103. Video data and/or text data may be transmitted from the video relay service 106 to the video communication device 102. The text data may include content such as the translated text for the content generated by the far-end user as translated by the video relay service 106. For embodiments that include video data from the video relay service 106, such video may include content such as an avatar making sign language gestures of content generated by the far-end user as translated by the video relay service 106. If the near-end user has at least some audible-capabilities (e.g., users that are not completely deaf), voice data may be transmitted in addition to the video data from the relay service 106 to the video communication device 102. In some embodiments, however, audio from the video communication device 102 may be disabled such that the video relay service 106 and/or the far-end communication device 104 may not be able to hear any speech or other audible noise from the video communication device 102.

Voice data (e.g., streaming audio data captured by a microphone) may be transmitted from the far-end communication device 104 to the video relay service 106 over the second connection 105. The voice data may include content such as the spoken language made by the near-impaired user. Voice data generated by the far-end user is not limited to live voice from a live person. For example, the far-end user may include an automated telephone menu system that transmits voice data that includes synthesized voice, recorded voice, or other audible information intended to convey information (e.g., interactive voice response (IVR)). Voice data and/or text data may be transmitted from the video relay service 106 to the far-end communication device 104 over the second connection 104. This voice data may include content such as the translated synthesized voice translated from the sign-language content generated by the hearing-impaired user as translated by the video relay service 106.

The video relay service 106 is configured to interpret communication between the video communication device 102 and the far-end communication device 104 to facilitate assisted communication sessions therebetween. The relay service 106 may include a profile server 107 including a customer database 108 and other databases storing information from which the relay service 106 may query to authenticate registered users, establish communication sessions, route communication sessions, etc. For example, the customer database 108 may include customer records including the name, address (e.g., street address, city, state, zip code, etc.), and other information for establishing the user as a valid customer of the relay service 106 for participating in assisted calls.

The video relay service 106 may also include an AI translation engine 110. The AI translation engine 110 may also include one or more AI servers 112 configured to manage translation databases and specific parallel processor hardware used in the translation process of sign language to voice, sign language to text, voice to text, voice to simulated sign language, and combinations thereof during a real-time communication session between a hearing-impaired user and a hearing-capable user. As a result, the need for a human translator serving as an intermediary during a call may be eliminated. The AI servers 112 may be cloud-based servers hosting the AI translation database in a manner that is accessible to the video relay service 106 in order to simultaneously perform translation services for multiple calls at a given time for different hearing-impaired users of the communication system 100. In order to achieve real-time translation the image or voice input may be split across many parallel processors and many parallel databases to effectively use the AI hardware. In some embodiment, the voice and/or signer may pause briefly (e.g., few milliseconds) between words and/or phrases to allow the parallel processors to determing a match in the respective language database. The word or phrase may extend over many frames of video and need to be analyzed in real-time by the AI engines, which may also be the case for the voice input into the AI engines.

Figure 2:
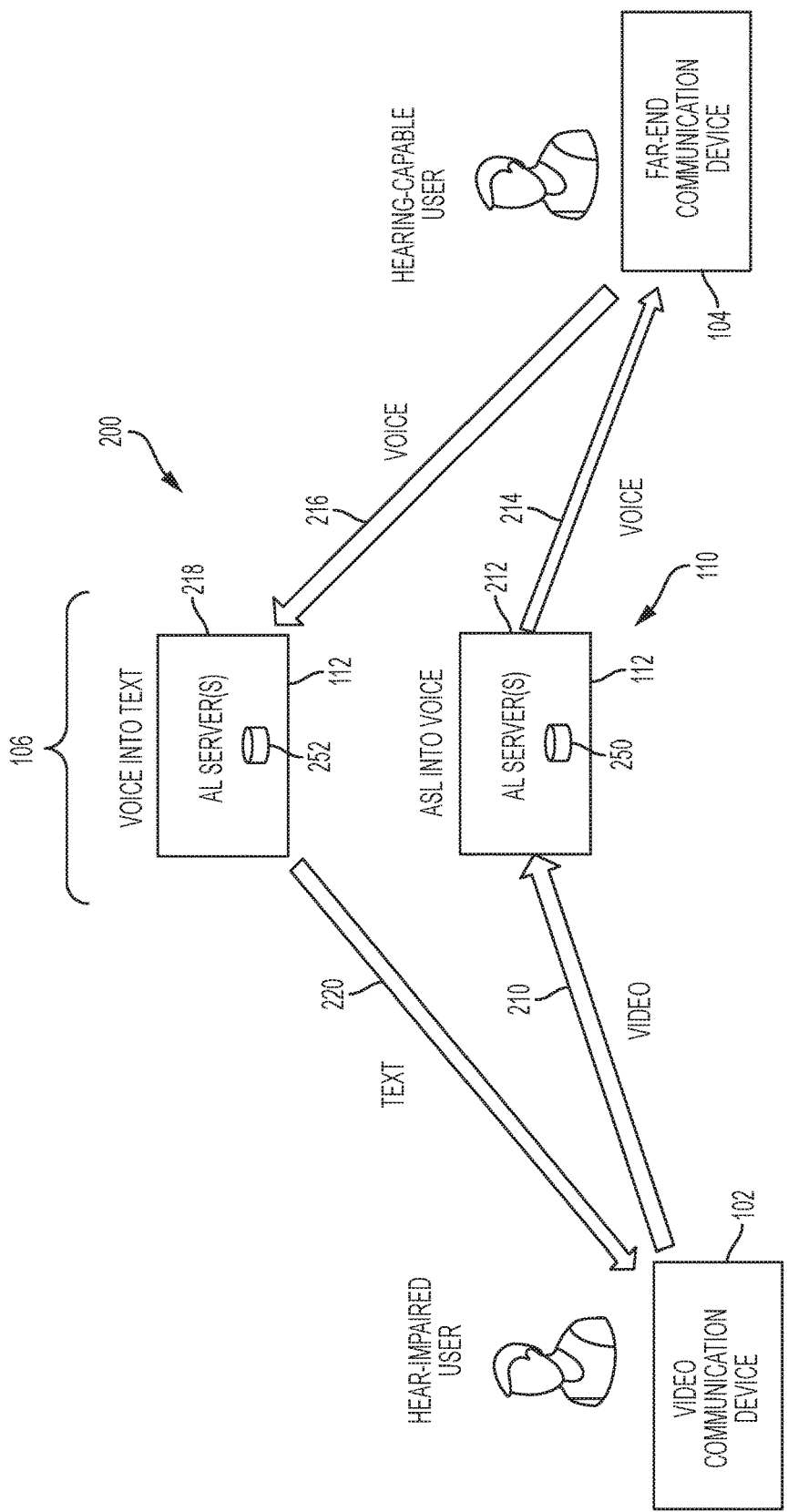
FIGS. 2 through 5 are simplified block diagrams of communication system showing various data flows according to embodiments of the disclosure.

FIG. 2 is a simplified block diagram of a communication system 200 showing the data flow according to an embodiment of the disclosure. The communication 200 includes the video communication device 102, the far-end communication device 104, and the video relay service 106. The video relay service 106 includes an AI translation engine 110 including AI servers 112 as discussed above. The AI servers 110 may include translation databases 250 stored thereon for its processors to query, update, etc. to perform the translation operations during the real-time communication session.

In operation, the hearing-impaired user signs to the camera of the video communication device 102, which transmits the video data with a video stream to the video relay service 106 at operation 210. At operation 212, the AI translation engine 110 of the video relay service 106 receives and analyzes the video stream (e.g., frame by frame, breaking down each image into sub-images for comparison against the database for recognition), and recognizes the sign language (e.g., ASL words or phrases) according to the video files for various phrases stored in an AI translation database 250. Examples of various AI translation systems may include an alphabet pattern recognition algorithm to recognize the spelling of a word on a letter-by-letter basis. Other systems may include convolutional neural networks (CNNs) or deep neural networks (DNNs) to map the raw pixels of the image data to corresponding phrase database. Such processing may be performed by parallel graphics processing units (GPUs) to achieve tremendously accelerated learning and inference ability at a speed (e.g., 30 fps or more) needed to support a real-time communication session. As a result, the sign language is translated into the language understood by the hearing-capable user (e.g., English, Spanish, etc.). The AI translation engine 110 may also generate synthesized voice of the translation that is transmitted as voice data to the far-end communication device 104 at operation 214. The synthesized voice may be reproduced by the speaker of the far-end communication device 104. In an alternative embodiment, the video relay service 106 may transmit the translation to the far-end communication device 104 as text data. As a result, the far-end communication device 104 may be configured to generate the synthesized voice locally responsive to the text data received from the video relay service 106.

At operation 216, the hearing-capable user speaks into the microphone of the far-end communication device 104, which transmits the voice data with an audio stream to the video relay service 106. At operation 218, the AI translation engine 110 of the video relay service 106 receives and analyzes the audio stream, and recognizes the spoken language (e.g., English, Spanish, etc.) according to various voice recognition systems. This translation may occur using various voice recognition services that translate voice data into text data as known in the art or other speech-to-text systems that use phonetic sound libraries 252 and grammar rules to recognize words and phrases using contextual information or that are configured to read text outload. As a result, the spoken language is translated into a textual based language understood by the hearing-capable user (e.g., text of English, Spanish, etc.). The AI translation engine 110 may transmit the translation as text data to the far-end communication device 104 at operation 220. The translated text is then displayed on the electronic display of the video communication device 102. In some embodiments, the spoken language of the hearing-capable user may be the same as the textual language of the hearing-capable user (e.g., English/English, Spanish/Spanish, etc.). In some embodiments, the spoken language of the hearing-capable user may be different than the textual language of the hearing-capable user (e.g., English/Spanish, Spanish/English, etc.). As a result, the AI translation engine 110 may be configured to perform multiple levels of translation, such as from Spanish voice into English text. In some embodiments, the voice to text translation may be performed by a captioning service such as described in U.S. Pat. No. 9,336,689, issued May 10, 2016, entitled "Methods and Apparatuses Related to Text Caption Error Correction," the disclosure of which is incorporated herein in its entirety by this reference.

Figure 3:
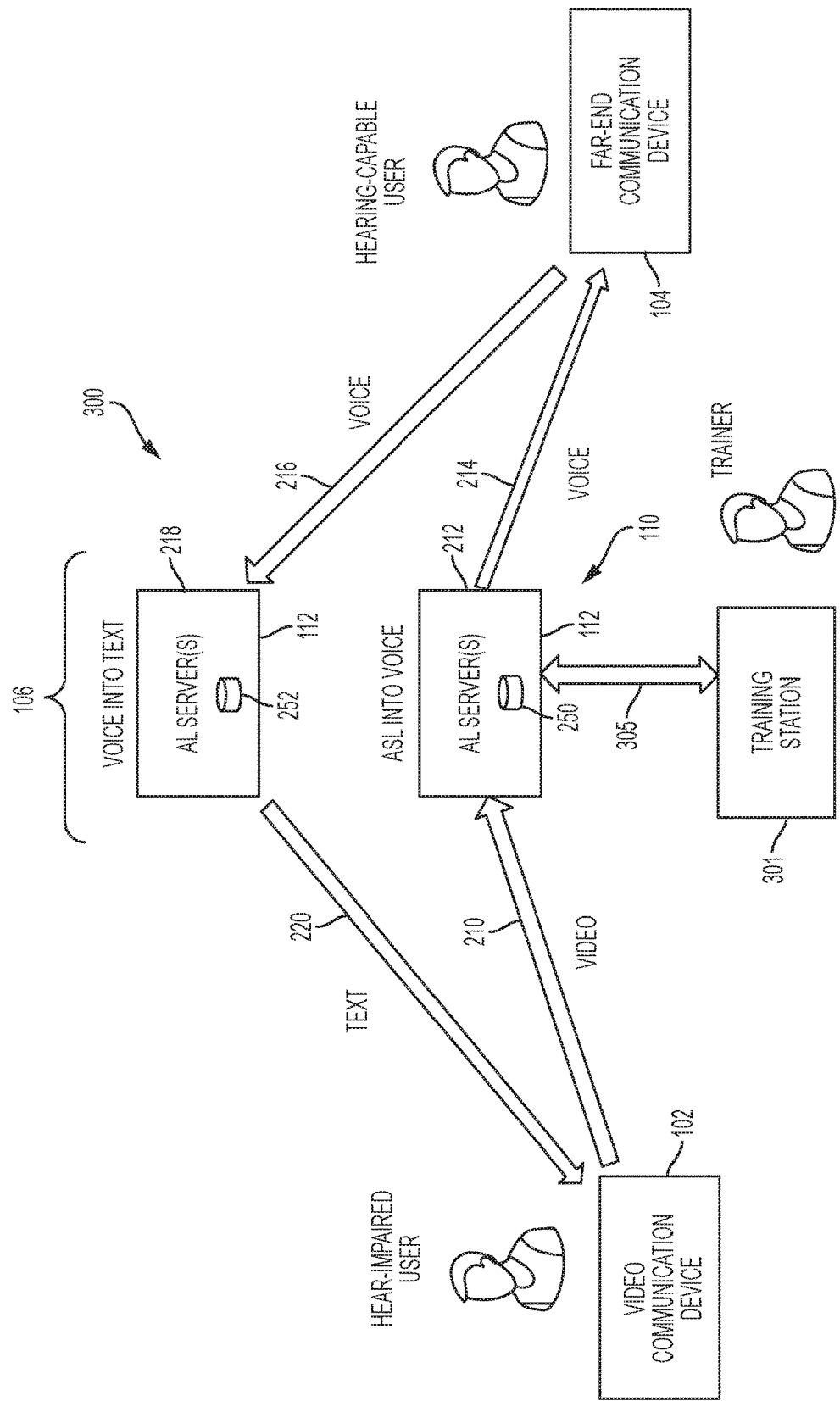

FIG. 3 is a simplified block diagram of a communication system 300 showing the data flow according to an embodiment of the disclosure. The communication 300 includes the video communication device 102, the far-end communication device 104, and the video relay service 106. The video relay service 106 includes an AI translation engine 110 including AI servers 112 as discussed above. The AI servers 110 may include translation databases 250 stored thereon for its processors to query, update, etc. to perform the translation operations during the real-time communication session. The communication system 300 may include a training station 301 within the video relay service 106 to improve the accuracy of the translation services. The training station 301 may be operated by a human operator (referred to as a "trainer") who understands sign language. The training station 301 may be configured to update the databases of the AI engine 110.

The data flow of FIG. 3 may be similar to the data flow of FIG. 2, but with the addition of communication occurring with the training station 301 at operation 305. In some embodiments, the trainer may monitor at least some of the communication sessions being facilitated by the video relay service 106. Thus, the training station 301 may be configured to receive the video data that includes the sign language content as well as the translated output (as synthesized audio and/or text) to review the accuracy of the automatic translation. If errors are identified, the trainer may enter the corrections into the training station 301, which then transmits the corrections to the AI servers 112 for updating the AI translation database 250 to be used in future calls facilitated by the video relay service 106. Voice to text translation and training each of the AI databases may also be improved similarly.

In some embodiments, this review process may occur after the call has ended with the trainer reviewing stored video and a corresponding transcript of the translation from the call. In some embodiments, a random sampling of calls (or portions of calls) may be saved in such a manner to provide for a repository of source material for the trainers to review and update the AI translation database 250 to improve accuracy that occurred in the translation. Thus, not every call may have its video and transcript stored by the system for review by the trainer. The video files with the sign language and the translated output files may be stored in the AI servers 250 or other external servers of the video relay service for the training station 301 to access when performing the review process. The translated output files may be saved as a text file with a textual transcript and/or an audio file with the synthesized audio translation for the trainer to review. In some embodiments, the files may be synchronized such that playback of the video and corresponding translation may be reviewed together. For example, the textual transcript may be time stamped such that viewing the sign language and the written text may be viewed through the user interface to be displayed together. In other embodiments, the textual transcript may be displayed in its entirety for the trainer to review as a whole with the sign language.

In some embodiments, the review process may occur during the call such that the training station receives real-time video and the corresponding transcript of the translation during a live call for the trainer to review. In some embodiments, a random sampling of calls (or portions of calls) may be connected to the training station 301 in such a manner to provide for the trainers to review and update the AI translation database 250 to correct for errors that occurred in the translation. For embodiments that include real-time monitoring during the call, in some embodiments the trainer may notify one or more of the parties of the incorrect translation. For example, the training station 301 may transmit a notification to the video communication device 102 for display to the hearing-impaired user to clarify a sign if it was unclear what the sign was. As a result, the hearing-impaired user may more clearly or slowly perform the sign or otherwise clarify what was said in the portion of the translation that was deemed incorrect. The AI translation engine 110 may then translate the new sign language content to update the AI translation database and/or transmit the corrected voice of the translation to the far-end communication device 104. In some embodiments, the training station 301 may transmit a notification to the far-end communication device 104 (e.g., by voice and/or text) to inform the hearing-capable user of an incorrect translation. If the trainer was able to determine the appropriate correction on her own, the trainer may simply utilize the training device 301 to make the correction to the AI translation database 250 and/or transmit the notification to the far-end device 104 without interrupting the hearing-impaired user. As a result, utilizing the training station 301 may improve the service quality by enabling a human sign language interpreter to monitor sign language to voice translation accuracy and improve the AI vocabulary by defining rare words/phrases or to account for different styles of signing that previously were not accounted for by the AI translation engine 110.

In some embodiments, the trainer may also perform a review of the voice to text translation, and update the phonetic sound libraries 252 or grammar rules and/or notify the parties in a similar manner. Thus, utilizing the training station 301 may improve the service quality by enabling a human trainer to monitor voice to text translation accuracy and improve the AI vocabulary by defining rare words/phrases or to account for different dialects that previously were not accounted for by the AI translation engine 110.

Figure 4:
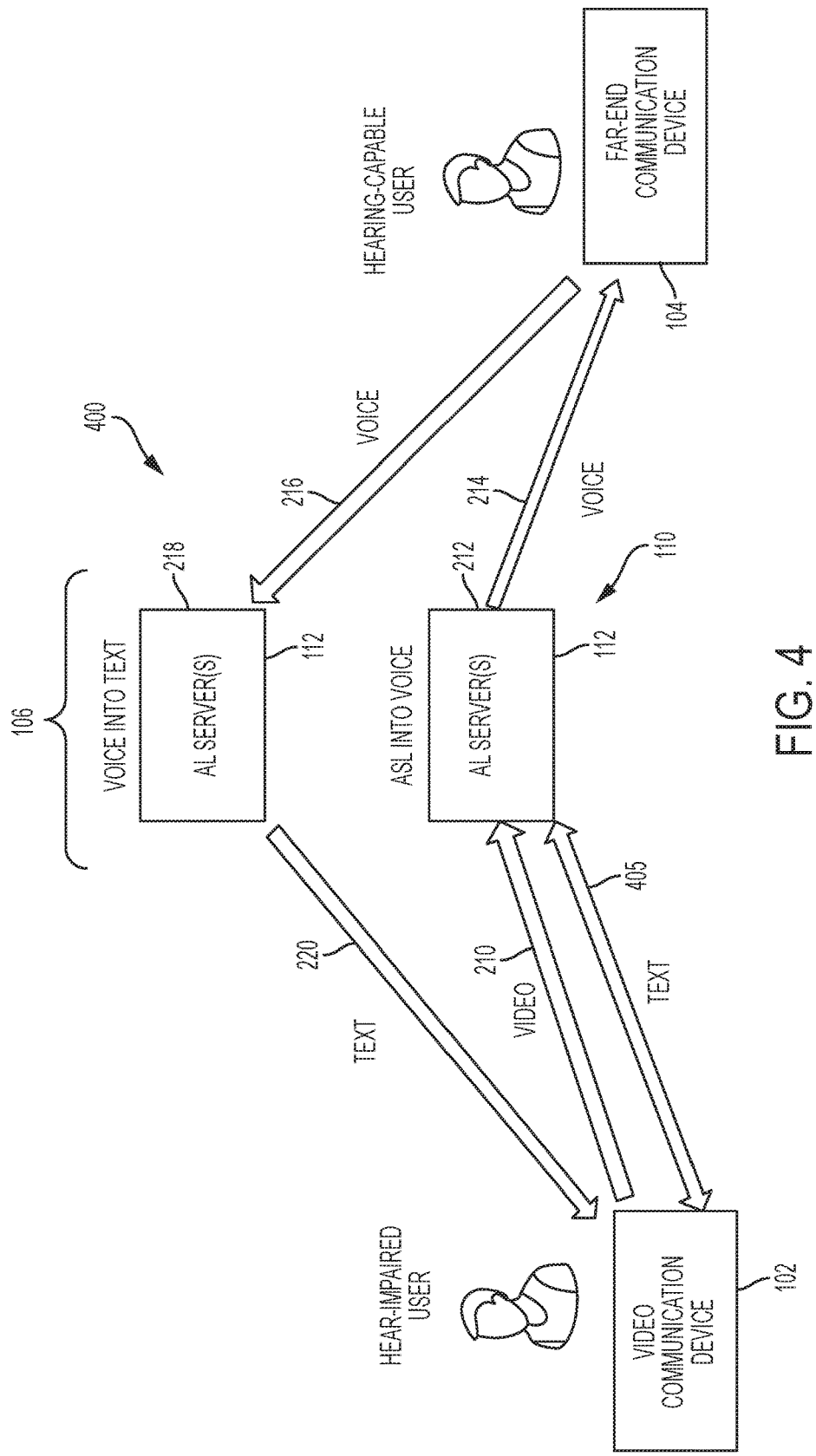

FIG. 4 is a simplified block diagram of a communication system 400 showing the data flow according to an embodiment of the disclosure. The communication 400 includes the video communication device 102, the far-end communication device 104, and the video relay service 106. The video relay service 106 includes an AI translation engine 110 including AI servers 112 as discussed above. The AI servers 110 may include translation databases 250 stored thereon for its processors to query, update, etc. to perform the translation operations during the real-time communication session.

The data flow of FIG. 4 may be similar to the data flow of FIGS. 2 and 3, but with the addition of text of the translation of the sign language content being transmitted back to the video communication device 102 at operation 405. During the call, a text translation of the sign language content of the near-end video may be transmitted from the video relay service 106 to the video communication device 102 for display by the video communication device 102. As a result, the hearing-impaired user may be able to monitor the translation to ensure that in real-time to determine whether the translation accurately reflects what was signed. If there is an error or misunderstanding, the hearing-impaired user may clarify the error by re-signing the phrase for correction and/or providing additional explanation to achieve a proper understanding. During this time, the AI translation engine 110 may continue to translate sign language content from incoming video data from the video communication device 102 into voice data for the far-end communication device 104. In some embodiments, the interface for the video communication device 102 may be configured to edit the translated text being displayed. Thus, the hearing-impaired user may utilize an input device (e.g., keyboard, mouse, remote control, etc.) to manually make corrections in the translated text. The corrected text may then be transmitted back to the relay service 106 and forwarded on to the far-end communication device 104 in a message with the clarified text. In some embodiments, the corrected text or other message input by the hearing-impaired user may be converted into synthesized audio for reproduction by the far-end communication device 104.

In some embodiments, the hearing-impaired user may perform tasks discussed above with respect to the trainer. For example, the hearing-impaired user may review the text of the translated output for the call to identify errors in the translation. As discussed above, this review may occur during a live call in order to enable the hearing-impaired user to provide real-time correction or clarification to the hearing-capable user for a mistranslation. In some embodiments, the review of the translation by the hearing-impaired user may occur after completion of the call. For example, the user interface presented by the video communication device 102 may enable the hearing impaired user to enter into a training mode to review video and corresponding translations. In such embodiments, the corrections and/or other feedback provided by the hearing-impaired user may also be used by the AI translation engine 110 to update the AI translation database 250. The hearing-impaired user may have editing capabilities to define starting frames and ending frames for certain phrases and then an input field to enter the corresponding translation. Such changes may be made from stored video from an actual call. In some embodiments, the hearing-impaired user may prefer to record new video from which new phrases and/or update phrases can be defined and transmitted to the video relay service 106 to update the AI translation database 250. Over time as the AI translation database 250 grows in size the accuracy will increase.

In some embodiments, transmitted updates for the AI translation database 250 made by the hearing-impaired user may be reviewed first by a trainer for approval before updating the AI translation database 250. Thus, the AI servers 212 of the video relay service 106 may receive and store video files and their corresponding translations generated by hearing-impaired users of the communication system 400. If approved, the video files (perhaps with some modifications) may be added to the AI translation database 212 for future calls made by hearing-impaired users of the communication system 400.

In some embodiments, suggested updates made by individual hearing-impaired users may be stored in a user-specific AI translation database. The user-specific AI translation database may only be used by the AI translation engine 110 during calls involving the specific hearing-impaired user rather than by all hearing-impaired users of the communication system 400. For example, during the approval process the reviewer may determine that the signing used for a particular phrase is unique to the specific user rather than a global method of signing the phrase. As a result, the AI translation engine may manage a global database for the AI translation database 250 as well as a plurality of user-specific AI translation databases for each hearing-impaired user of the communication system 400. Thus, during a call, the AI translation engine 110 may utilize both the global AI translation database 250 as well as an individual user-specific database when performing the sign language translation.

Figure 5:
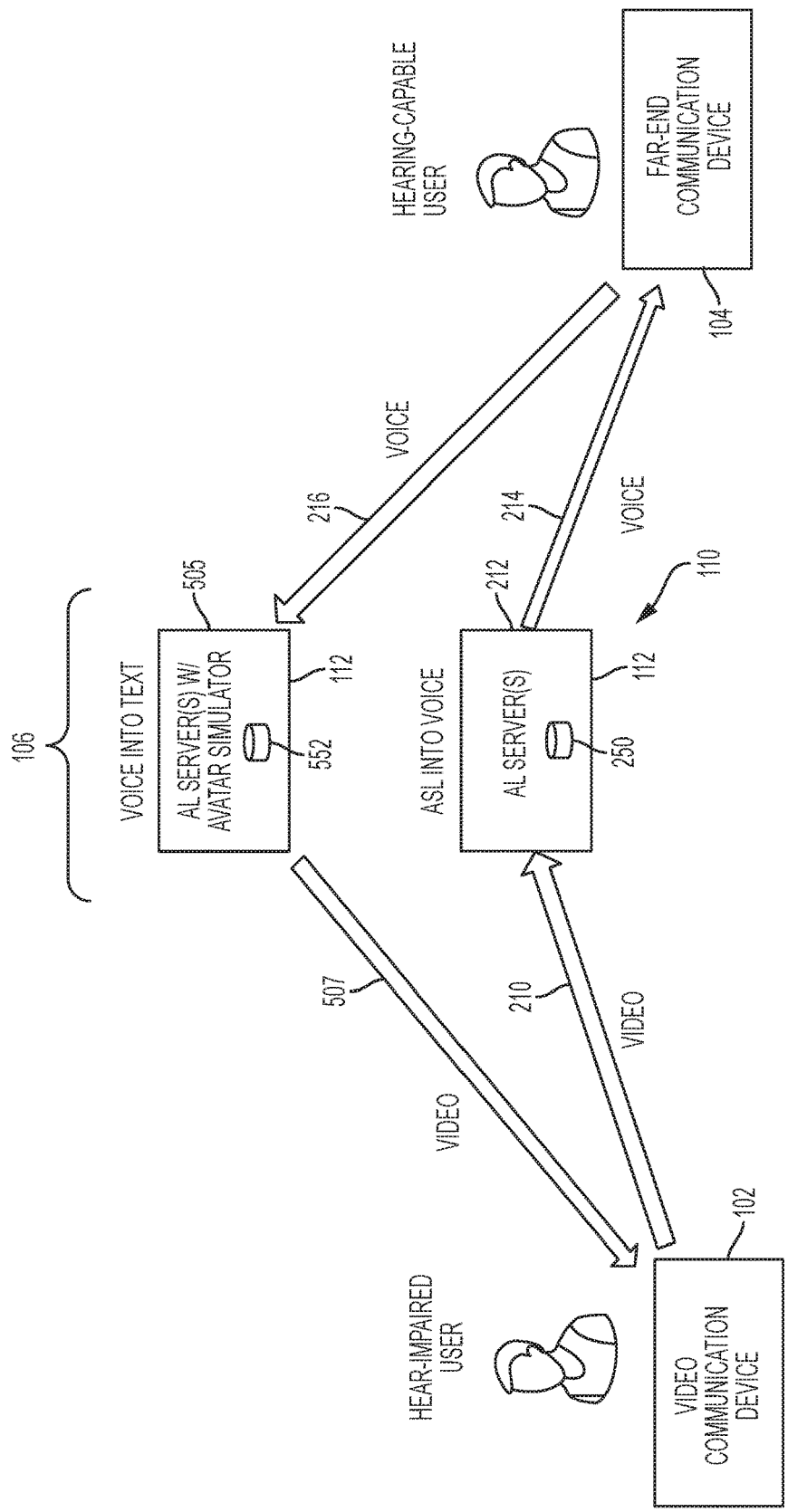

FIG. 5 is a simplified block diagram of a communication system 500 showing the data flow according to an embodiment of the disclosure. The communication 500 includes the video communication device 102, the far-end communication device 104, and the video relay service 106. The video relay service 106 includes an AI translation engine 110 including AI servers 112 as discussed above. The AI servers 110 may include translation databases 250 stored thereon for its processors to query, update, etc. to perform the translation operations during the real-time communication session.

The data flow of FIG. 5 may be similar to the data flow of FIGS. 2-4, but with the addition of an avatar simulator with the AI servers 112 used in the translation of the voice of the hearing-capable user at operation 505. The avatar simulator may be configured to generate video data for an avatar that performs simulated sign language when displayed by the video communication device 102. The AI translation servers 112 may also manage an avatar database 552 having phrases for different avatar signs stored therein. The avatar translation may be transmitted to the video communication device 102 as video data at operation 507, from which the video communication device 102 may display the avatar performing the signs of the translation. In some embodiments, the avatar database 552 may be populated with analyzing the video data from the AI translation database 250 and converting the sign language motions from each video file of the AI translation database into an avatar equivalent file. As a result, each avatar equivalent file may be linked to a phrase corresponding to the sign language motion of the file. In some embodiments, avatar files may be generated using motion sensors worn by human signers to capture the motions for various signed phrases to generate the corresponding avatar files to build the avatar database 552. As the AI translation database 250 grows, it may be linked to the avatar database 552 to have each expand together.

Adding to and/or correcting the avatar database 552 may be performed by trainers who review voice to avatar translations to identify and correct errors made by the AI translation engine 110. In addition, a text caption of the far-end voice may be sent to the video communication device 102 for display thereon in order for the hearing-impaired user to compare to the signs performed by the avatar during the call. In such embodiments, errors in the avatar translation may be identified by the hearing-impaired user who may notify the video relay service 106 of the error such that the avatar database 552 may be updated for future calls to the system 500.

Figure 6:
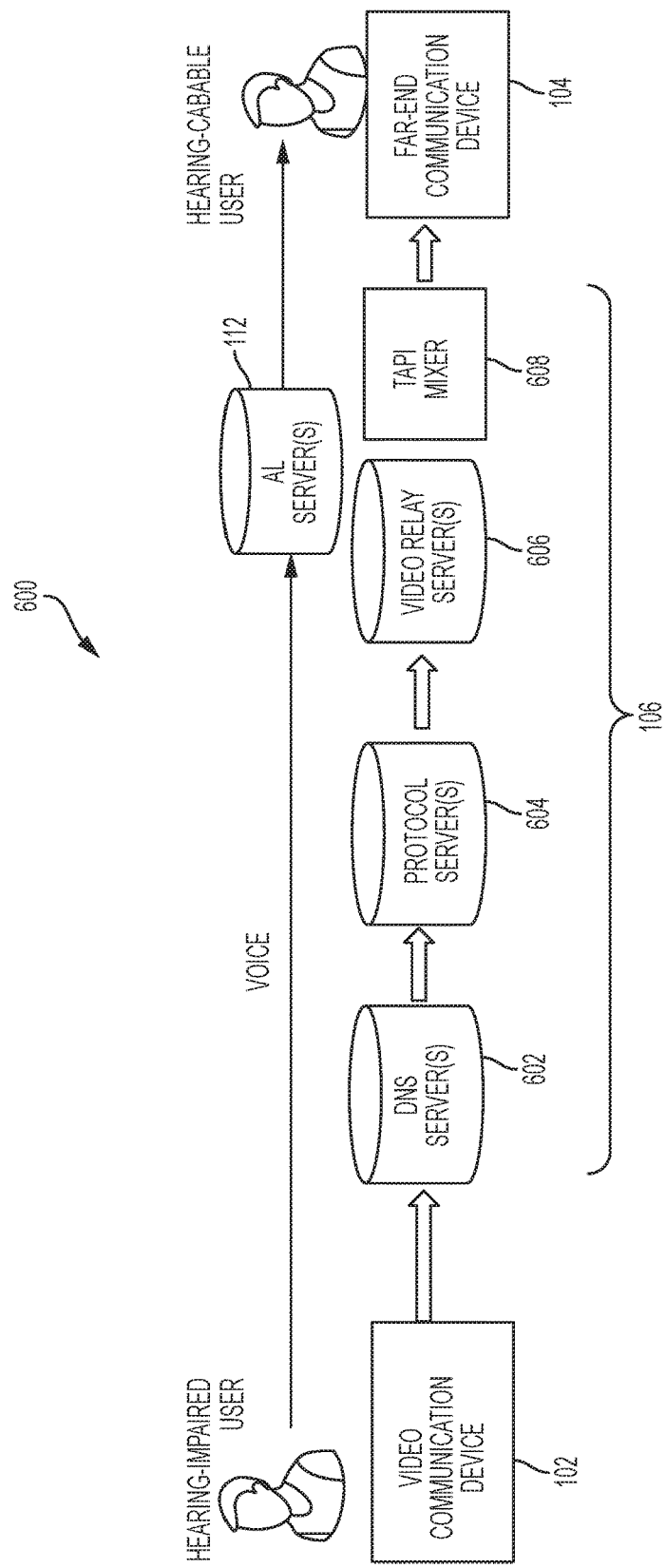
FIGS. 6 and 7 are simplified block diagrams of a call flow illustrating additional components of the backend system for the video relay service according to an embodiment of the disclosure.
Figure 7:
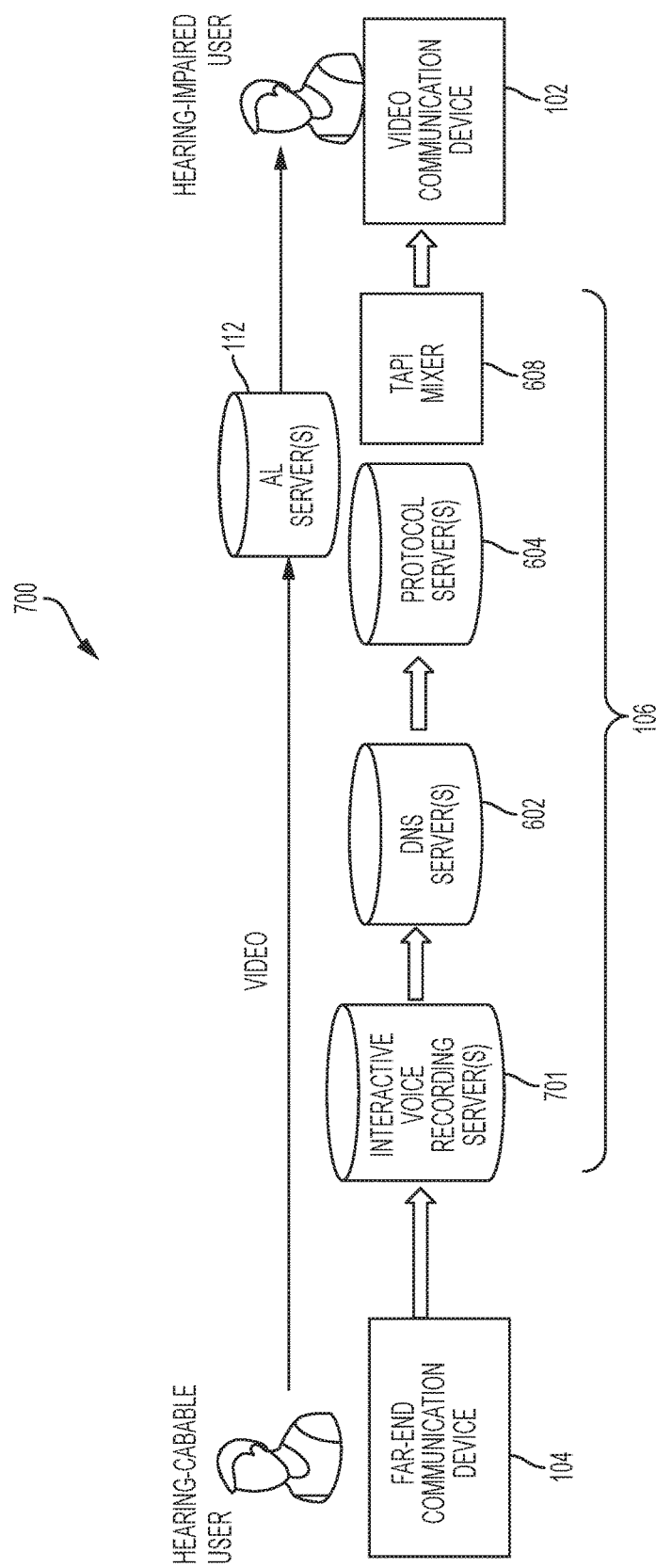

FIGS. 6 and 7 are simplified block diagrams of call flows 600, 700 illustrating additional components of the backend system for the video relay service 106 according to an embodiment of the disclosure. In particular, the call flow shown in FIG. 6 corresponds to a call being initiated by the video communication device 102 associated with the hearing-impaired user. The call flow shown in FIG. 7 corresponds to a call being initiated by the far-end communication device 102 associated with the hearing-impaired user. The backend system of the video relay service 106 may include servers such as DNS server(s) 602, protocol server(s) 604, video relay service server(s) 606, TAPI mixer 608, an interactive voice recording server(s) 701, and AI server(s) 112.

Referring specifically to FIG. 6, a call may be initiated from the video communication device 102 associated with the hearing-impaired user. A call request may be transmitted by the video communication device 102 to the video relay service 106. The call request may be received by a DNS server 602 or other server (e.g., a hold server, routing server, authentication server, etc.). The DNS server 602 is configured to resolve the phone number from the call request, and sends the call to a protocol server 604 acting as a gateway to a video relay server 606. The video relay server 606 performs the call management (e.g., routing) between the video communication device 102 and the far-end communication device 104 along with the TAPI mixer that generates the audio to the far-end communication device 104. When the call between the video communication device 102 and the far-end communication device 104 is established through the video relay server 606, the video stream from the video communication device 102 may be transmitted to the AI servers 112 (e.g., via protocols such as SIP, H.323, etc.) for automatic translation of the sign language content to synthesized audio that is transmitted to the far-end communication device 104. In some embodiments, the call request may be initially received by an interactive voice response (IVR) server that may also act as the routing server if interacting with an IVR is desired for the hearing-impaired user to direct the call to the appropriate party.

Referring specifically to FIG. 7, a call may be initiated from the video communication device 102 associated with the hearing-impaired user. A call request may be transmitted by the far-end communication device 102 to the video relay service 106. The call request may be received by an interactive voice recording (IVR) server 701 if such an IVR service is desired for the hearing-capable user to direct the call to the appropriate party. In such an embodiment, the IVR server 701 may performs the call management (e.g., routing) between the video communication device 102 and the far-end communication device 104. The WR server 701 may communicate the phone number from the call request to the DNS server 602 to resolve the phone number, and send the call to a protocol server 604 acting as a gateway for the call. The TAPI mixer that generates the video to the video communication device 104 associated with the hearing-impaired user. When the call between the far-end communication device 104 and the video communication device 104 is established through the IVR server 701 (or other call routing server), the audio stream from the far-end communication device 104 may be transmitted to the AI servers 112 (e.g., via protocols such as SIP, H.323, etc.) for automatic translation of the voice content to text and/or simulated sign language that is transmitted to the video communication device 102 associated with the hearing-impaired user. In some embodiments, the call request may be initially received by the DNS server 602 or other server (e.g., hold server, routing server, authentication server, etc.) if interacting with an IVR is not desired and one or more other server in the call flow may perform that call management functions (e.g., routing) for the call.

Figure 8:
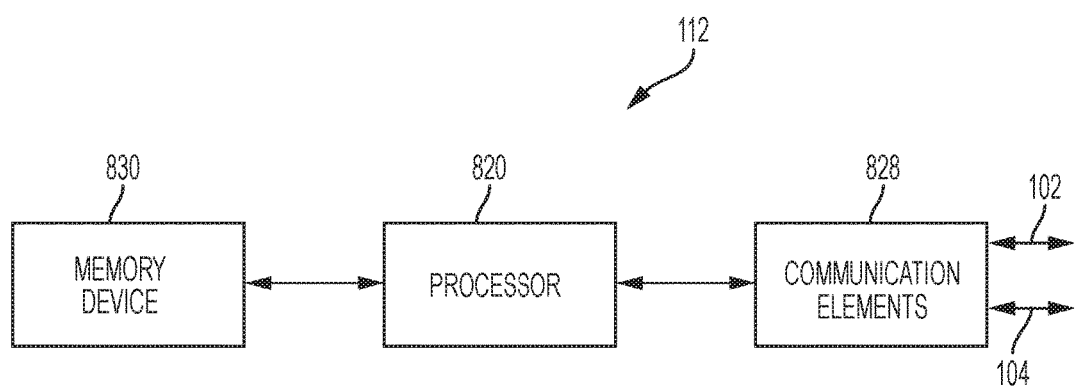
FIG. 8 is a simplified block diagram of an AI server according to an embodiment of the disclosure.

FIG. 8 is a simplified block diagram of an AI server 112 according to an embodiment of the disclosure. The AI server 112 may be one of the AI servers discussed in the examples above. The AI server 112 may include a processor 820 operably coupled with one or more communication elements 828 (e.g., transmitters, receivers, transceivers, and other wired and/or wireless interfaces to send/receive data), and a memory device 830 (e.g., non-volatile storage media and/or volatile media). Thus, the processor 820 may include one or more processors that coordinate the communication between the various devices as well as execute instructions stored in computer-readable media of the memory device 830. In particularly, many parallel processors may be needed to support the real-time requirements of the AI translation application. The memory device 830 may include volatile and non-volatile memory storage for the video communication device 102. For example, the processor 820 may include a video processors and audio processors. The AI server 112 may be configured to receive video and audio from the video communication device 102 and the far-end communication device 104 through the communication elements 828, and the processor 820 may perform the automatic translation services during a live communication session according to instructions stored in the memory device 830 as described herein. The memory device 830 may also store the AI translation databases used in the translation process, which may be updated as described herein.

The processor 820 may be configured to perform parallel image and object pattern recognition by performing a multi-frame analysis for complete ASL signs and phrases in addition to other conventional alphabetic or single frame comparisons of other systems. The AI translation database may include multi-frame images and objects or stored video data correlated to translated words and/or phrases (e.g., as labeled datasets), from which the processor 820 may be configured to compare portions of the live video stream and perform pattern recognition of the multiple frames to generate textual translation of the sign language in context. The comparison performed by the processor 820 may be a multiple frame recording from the live video stream against the stored multiple frame recordings stored in the in the AI translation database. Thus, in some embodiments the processor 820 may include multiple object engines instructing parallel GPUs to compare multiple frame video data from the live video stream with the multiple frame video data of the AI translation database to capture movement from entire words and/or phrases to perform the real-time sign language translation of a live communication session. Parallel DSP processors may also be needed for the real-time audio AI translation requirements. The processor 820 (or a processor of another AI server 112) may also be configured to perform the speech-to-text translation using voice recognition software to perform the real-time transcription (or translation into sign language via simulated avatar) to generate the return far-end information to the video communication device 102.

Figure 9:
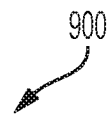
FIG. 9 is an example of a set of database entries stored in the AI servers as data objects in the AI translation database.

FIG. 9 is an example of a set of database entries 900 stored in the AI servers as data objects in the AI translation database. The database entries 900 may include video files containing multiple frames of data including a sign language phrase, as well as its corresponding text translation. For example, some video files correspond to individual words (e.g., dog, cat, etc.) or multiple word phrases formed from a combination of signs that translate into a partial sentence (e.g., going to the store) or a full sentence (e.g., How are you today?, I'm sorry, etc.). Words and phrases may be broken down into objects which are small portions of the image. The area of focus for the object may be the face and torso of the person signing. Face and torso recognition may also be used to narrow the region for object analysis in each frame. Each frame may have only a fraction of the sign for "dog" which may require many frames to complete the collection of object that make up a complete translation of the sign for "dog." Data files may also be included for individual signs of letters (e.g., A, B, etc.) or numbers (e.g., 1, 2, etc.) in case the sign language to be translated includes the hearing-impaired user spelling something. As shown in FIG. 9, some translations may correspond to multiple different video files, such as to account for different ways or styles for signing that particular word or phrase. In some embodiments, the video files may include a translation for more than one language (e.g., English, Spanish, etc.)

Figure 10:
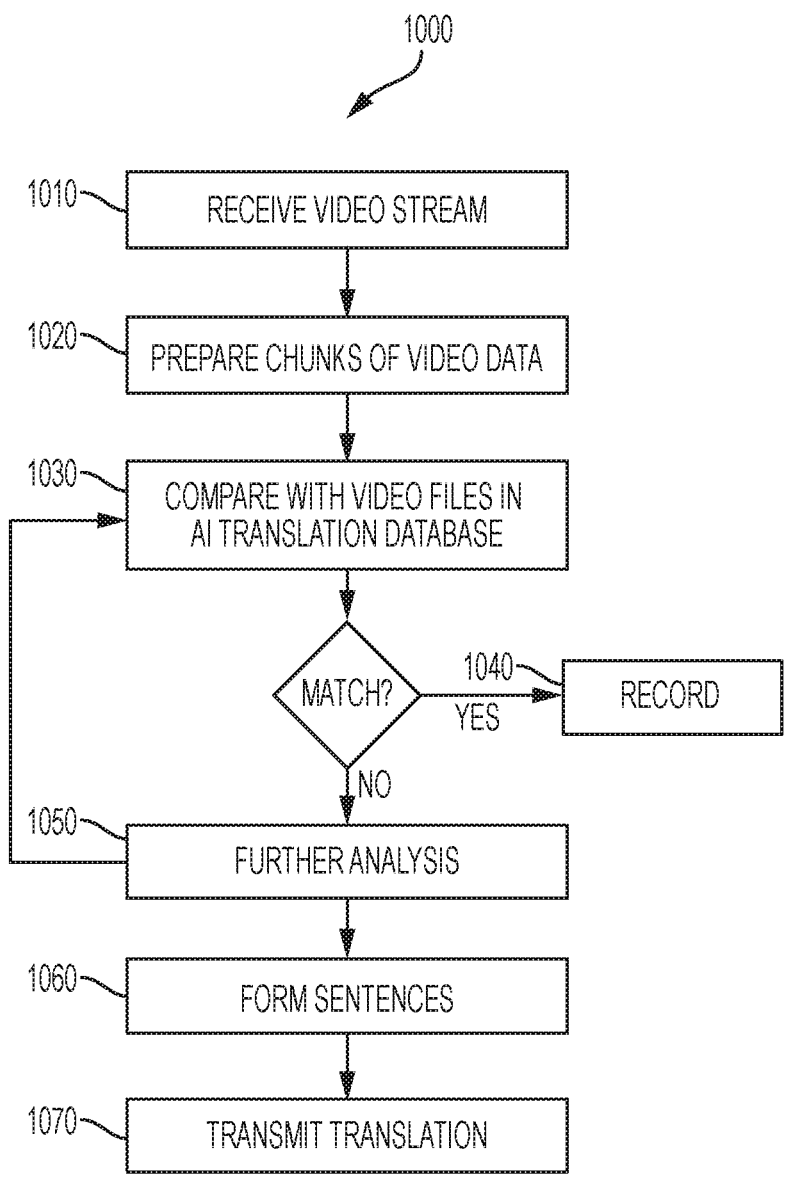
FIG. 10 is a flowchart illustrating a method of performing automatic sign language translation during a real-time communication session according to an embodiment of the disclosure.

FIG. 10 is a flowchart 1000 illustrating a method of performing automatic sign language translation during a real-time communication session according to an embodiment of the disclosure.

At operation 1010, a video stream may be received at the VRS service. The video stream may include the near-end video data captured and transmitted by the video communication device associated with the hearing-impaired user. The near-end video data may include the sign language gestures performed by the hearing-impaired user.

At operation 1020, chunks of video data may be prepared and normalized by the AI servers of the VRS service. In some embodiments, normalization may occur using facial recognition and/or torso recognition and then observing a "pause" between words and phrases. As a result, the AI servers can focus the parallel processing power to address the actual communication and avoid other object in the scene that are not relevant. In some embodiments, the size (e.g., number of frames) of the data chunks may be hard-coded. For example, 15 frames of data may be continuously formed into chunks at a time on a rolling basis. Based on motion sensing and/or analysis of the video data, forming the data chunks may not occur when it is determined that that hearing-impaired user is not signing in some embodiments. In other embodiments, the size of the data chunks may be determined by the motion sensing or analysis of the video data. For example, the size of the initial data chunk may depend on the duration in which the hearing-impaired user is signing, based on observed pauses, or other dynamically changing lengths of frame data. This could include a long set of frames or multiple shorter sets of frames.

At operation 1030, the data chunks may be compared with the video files of the AI translation database to identify corresponding words and or phrases. In some embodiments, the contextual clues from surrounding translated words or phrases may be used during the comparison operation to speed up the processing so that the data chunk need not be compared to the entirety of the AI translation database. For example, the translation processing rules may identify relationships between words and combination of words to determine a set of words or phrases that are likely to come next, and then perform a comparison based on those words or phrases first. For example, certain words or phrases may be categorized by subject matter or other relationships to provide contextual clues for determining what grouping of words or phrases to search first or some other hierarchy. Over time, the AI engine may automatically update the database to link these types of relationships or create new categories or links within the database entries in order to further improve the speed and accuracy of translation.

If a match is found, the corresponding word and/or phrase may be recorded at operation 1040. If a match is not found, further analysis of the data chunk may be warranted at operation 1050. For example, if the size of the data chunk was relatively large (e.g., above a threshold level of frames), the larger data chunk may be divided into smaller data chunks for comparison with the AI translation database to determine if subcomponents from a larger phrase may be identified by the AI translation database. If, however, the size of the data chunk was relatively small (e.g., below a threshold level of frames), the larger data chunk may be divided into smaller data chunks for comparison with the AI translation database to determine if more data was needed for the data chunk to be identifiable by the AI translation database. Thus, the number of frames for each data chunk compared to the AI translation database may be adaptable. In some embodiments, the number of frames for a data chunk may be adaptable based on the determined signing speed of the hearing-impaired user. After a number of failed attempts, the VRS service may attempt to figure out the sign or phrase based on contextual clues of the other translated data chunks. In some embodiments, the VRS service may transmit a message to the video communication device informing the hearing-impaired user that a particular sign was not determined, which may also prompt the hearing-impaired user to more clearly or deliberately perform a sign and/or add their own translation for the unknown sign to the database.

At operation 1060, a sentence may be formed from the recorded translated words and phrases. The VRS service may form the sentence based on grammatical rules to fit the recorded translations into a more grammatically correct sentence. In some embodiments, the contextual clues from the surrounding translations may be used to fill in gaps in the translations as needed.

At operation 1070, the translated text may be converted to synthesized audio that is transmitted to the far-end communication device for reproduction.

Figure 11:
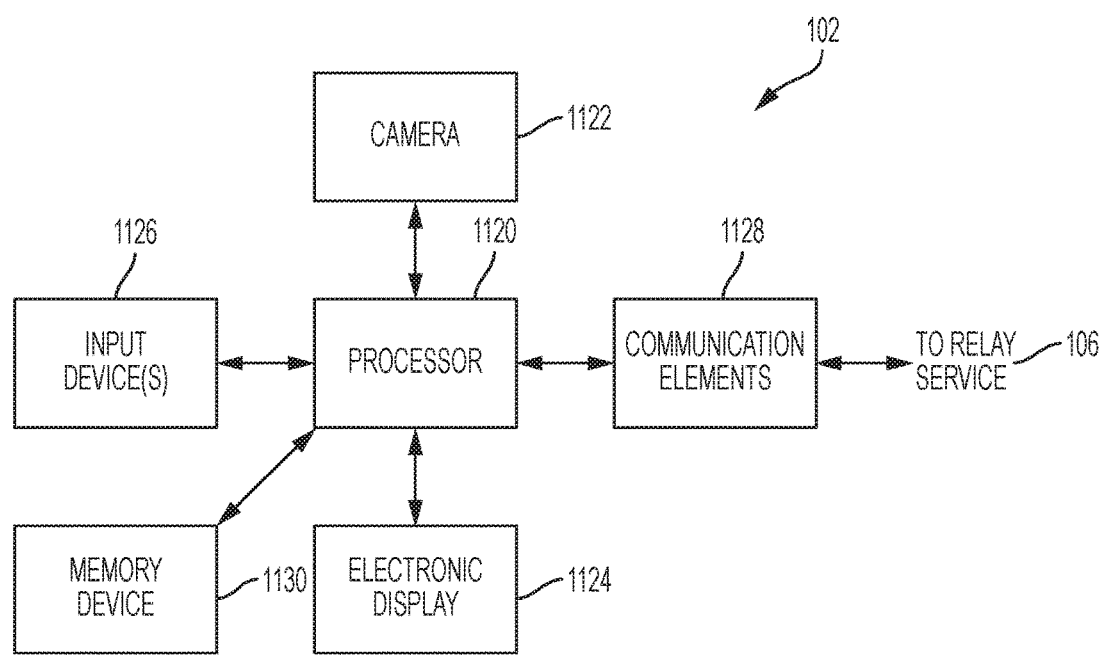
FIG. 11 is a simplified block diagram of a video communication device of FIG. 1.

FIG. 11 is a simplified block diagram of the video communication device 102 of FIG. 1. The video communication device 102 may include a processor 1120 operably coupled with a camera 1122, an electronic display 1124, input devices 1126, one or more communication elements 1128, and a memory device 1130. The video communication device 102 may be configured to communicate video data from the camera 1122 to the relay service 106 (FIG. 1) through the communication elements 1128. The video data captured by the camera 1122 may include sign language communication originated by the near-end user. The video communication device 102 may also be configured to receive video data 103 from the relay service 106 through the communication elements 1128 to be displayed by the electronic display 1124. The video data 103 received by the video communication device 102 may include sign language communication originated by the call assistant at the relay service 106.

The processor 1120 may coordinate the communication between the various devices as well as execute instructions stored in computer-readable media of the memory device 1130. The memory device 1130 may include volatile and non-volatile memory storage for the video communication device 102. The processor 1120 may include one or more processors. For example, the processor 1120 may include a video processor and an audio processor.

Input devices 1126 may include devices such as a keyboard, touch screen interface, remote control, microphone, infrared camera, motion sensors, or other devices that are configured to receive information that may be used by the processor 1120 to receive inputs that are used by the processor 1120 to determine the signing area and/or operate different functions of the video communication device 102.

In some embodiments, the camera 1122 may be integrated into the video communication device 102. The camera 1122 may be a camera 1122 integrated into a video phone. For example, the camera 1122 may be similar to the cameras described in U.S. Pat. No. 8,976,220 to Maxwell, issued Mar. 10, 2015, the disclosure of which is incorporated herein in its entirety by this reference. In other embodiments, the camera 1122 may be separate from the video communication device 102 but may be operably coupled to the video communication device 102. For example, the camera 1122 may be mounted to a display (e.g., a television) such that the display may serve as electronic display 1124 of the video communication device 102. The camera 1122 may be similar to the remote camera described in U.S. Pat. No. 9,432,622, filed Jun. 16, 2015, issued Aug. 30, 2016, the disclosure of which is incorporated herein in its entireties by this reference. In other embodiments, the camera 222 may include an image capturing device of one or more of a computer, laptop, phone, tablet, mobile device, PDA, etc. Furthermore, the camera 222 could be any image capturing device that can be used in conjunction with video communication.

Figure 12:
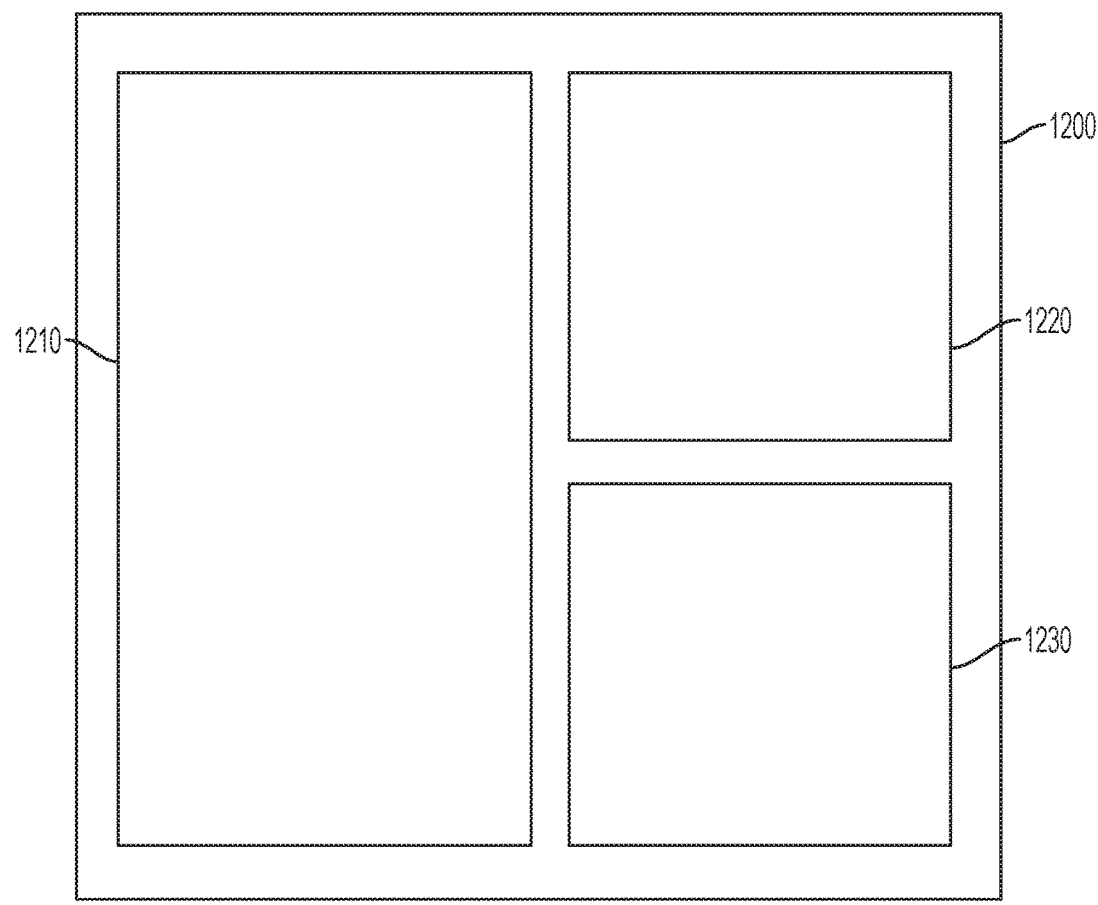
FIGS. 12 and 13 are examples of user interfaces that may be displayed on an electronic display by a video communication device to a hearing-impaired user during a real-time communication session (i.e., call) with a hearing-capable user according to embodiments of the disclosure.
Figure 13:
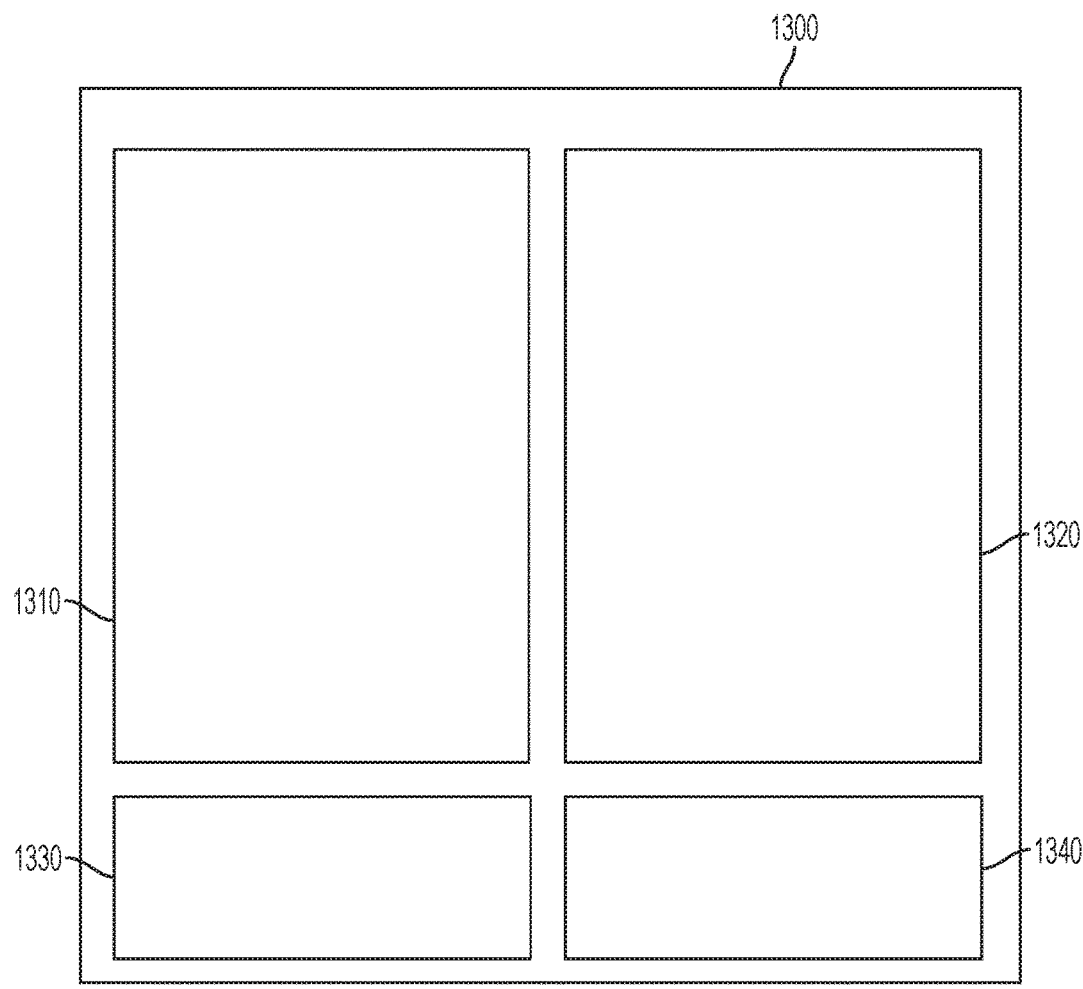

FIGS. 12 and 13 are examples of user interfaces that may be displayed on an electronic display by a video communication device to a hearing-impaired user during a real-time communication session (i.e., call) with a hearing-capable user according to embodiments of the disclosure.

Referring to FIG. 12, the user interface 1200 may include a video area 1210 for displaying the near-end video stream captured by the camera of the video communication device. In other words, the hearing-impaired user's own video stream may be displayed on the video communication device during the call. The user interface 1200 also includes a first text area 1220 for displaying the translated text received from the video relay service corresponding to the translation of the far-end user's audio. In some embodiments, the user interface 1200 may include a second text area 1230 for displaying the translated text received from the video relay service corresponding to the translation of the hearing-impaired user's near-end video. In other words, the text translation of the hearing-impaired user's own video stream may be displayed on the video communication device during the call.

Referring to FIG. 13, the user interface 1300 may include a first video area 1310 for displaying the near-end video stream captured by the camera of the video communication device. In other words, the hearing-impaired user's own video stream may be displayed on the video communication device during the call. The user interface 1300 may also include a second video area 1320 for displaying the avatar received from the video relay service corresponding to the translation of the far-end user's audio into an avatar performing sign language. In some embodiments, the user interface 1300 may include a text area 1330 for displaying the translated text received from the video relay service corresponding to the translation of the hearing-impaired user's near-end video. In other words, the text translation of the hearing-impaired user's own video stream may be displayed on the video communication device during the call. Another text area 1340 may be included to display translated text received from the video relay service corresponding to the translation of the far-end user's audio.

As a result of the various embodiments of the disclosure, a fully automatic translation of a full communication session between a hearing-impaired user and a hearing-capable user may be achieved in real-time. While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video relay service for providing automatic translation services during a real-time communication session, the video relay service comprising:
   at least one server configured to:
   receive a video stream containing sign language content from a video communication device associated with a hearing-impaired user;
   automatically translate the sign language content into a verbal language translation during the real-time communication session without assistance of a human sign language interpreter by comparing data chunks including multiple frames of the video stream with stored video files in an artificial intelligence (AI) database; and
   transmit the verbal language translation to a far-end communication device associated with a hearing-capable user during the real-time communication session.

2. The video relay service of claim 1, wherein the at least one server is configured to transmit the verbal language translation as synthesized audio.

3. The video relay service of claim 1, wherein the at least one server configured to receive new entries to add stored video files to the AI database from the video communication device that are available to other users during subsequent communication sessions facilitated by the video relay service.

4. The video relay service of claim 1, wherein the at least one server is further configured to:
   record portions of the communication sessions facilitated by the video relay service; and
   add new video files to the stored video files to the AI database generated from the recorded portions of the communication sessions by a training station that are available to other users during subsequent communication sessions facilitated by the video relay service.

5. The video relay service of claim 1, wherein the at least one server is further configured to:
   receive an audio stream from the far-end communication device during the real-time communication session;
   automatically translate voice content from the audio stream into another language translation during the real-time communication session; and
   transmit the another language translation to the video communication device associated with the hearing-impaired user during the real-time communication session.

6. The video relay service of claim 5, wherein the another language translation is first generated in a textual format generated by a speech-to-text voice recognition system.

7. The video relay service of claim 6, wherein the at least one server is configured to transmit the another language translation in the textual format.

8. The video relay service of claim 6, wherein the at least one server is configured to transmit the another language translation in simulated avatar format depicting the another language translation in sign language without assistance of a human sign language interpreter.

9. The video relay service of claim 6, wherein the at least one server is configured to transmit the another language translation in both the textual format and a simulated avatar format.

10. The video relay service of claim 6, wherein the at least one server is configured to transmit the verbal language translation to back to the video communication device associated with a hearing-impaired user during the real-time communication session.

11. The video relay service of claim 6, wherein the verbal language translation and the another is language translation are the same language.

12. The video relay service of claim 6, wherein the verbal language translation and the another is language translation are different languages.

13. A method of performing automated translation services during a real-time communication session, the method comprising:
   establishing a communication session between a video communication device associated with a hearing-impaired user and a far-end communication device associated with a hearing-capable user through an artificial intelligence (AI) translation engine;
   automatically generating, with the AI translation engine, a first translation of sign language content from a video stream from the video communication device without a human sign language interpreter performing the sign language translation for the communication session by dividing the video stream into data chunks of different lengths depending on phrases detected in the sign language content, and comparing the data chunks to stored video files in an AI translation database; and transmitting the first translation from the AI translation engine to the far-end communication device during the real-time communication session.

14. The method of claim 13, further comprising:
automatically generating, with the AI translation engine, a second translation of voice content from an audio stream from the far-end communication device; and transmitting the second translation from the AI translation engine to the video communication device during the real-time communication session.

15. The method of claim 13, wherein transmitting the first translation from the AI translation engine to the far-end communication device includes synthesized audio of the first translation.

16. The method of claim 13, further comprising transmitting the first translation from the AI translation engine to the video communication device during the real-time communication session.

17. The method of claim 16, wherein transmitting the first translation from the AI translation engine to the video communication device includes textual content of the first translation.

18. A video communication system comprising:
a plurality of video communication devices configured for hearing-impaired users to engage in communication sessions with hearing-capable users; and a video relay service configured to:
establish communication sessions between video communication devices associated with hearing-impaired users and far-end communication device associated with hearing-capable users;

automatically generate translations of sign language content from a video stream from a corresponding video communication device associated with a hearing-impaired user during real-time communication sessions without a human sign language interpreter performing the sign language translation for the communication session by comparing data chunks including multiple frames of the video stream with stored video files in an artificial intelligence (AI) database of an AI translation engine;

transmit the translation from the AI translation engine to a corresponding far-end communication device associated with a hearing-capable user;

automatically generate with the AI translation engine, a second translation of voice content from an audio stream from the corresponding far-end communication device; and transmit the second translation from the AI translation engine to the video communication device during the real-time communication session.

19. The video relay service of claim 1, wherein the at least one server is configured to detect a pause between a word or phrase to extract the data chunks from the video stream for comparison with the stored video files in the AI database.

20. The video relay service of claim 1, wherein a size of the data chunks are hard coded by the at least one server.

21. The video relay service of claim 1, wherein the at least one server is configured to determine the size of the data chunks based, at least in part, on determining a signing speed for the hearing-impaired user.

22. The video relay service of claim 1, wherein the at least one server is configured to continuously form the multiple frames of data into the data chunks on a rolling basis.

23. The video relay service of claim 1, wherein the at least one server is configured to compare the data chunks first with a selected portion of the AI database responsive to determining contextual relationships from surrounded translated words or phrases.

24. The method of claim 13, wherein the different lengths of the data chunks are dynamically changing during the communication session.

* * * * *